United States Patent [19]
Glazar

[11] Patent Number: 5,359,776
[45] Date of Patent: Nov. 1, 1994

[54] WINDSHIELD WIPER SHARPENING DEVICE

[76] Inventor: Arthur J. Glazar, 31 Amapola La., Kings Park, N.Y. 11754-3908

[21] Appl. No.: 157,465

[22] Filed: Nov. 22, 1993

[51] Int. Cl.$^5$ .............................................. B26B 3/00
[52] U.S. Cl. ....................................... 30/169; 30/280; 30/294
[58] Field of Search ................ 30/169, 136, 286, 289, 30/280, 294, 314; 15/236.01; D32/46, 48

[56] References Cited

U.S. PATENT DOCUMENTS

| | | | |
|---|---|---|---|
| 1,770,336 | 7/1930 | Gruber | 30/280 |
| 2,881,520 | 4/1959 | Mito | 30/280 |
| 5,058,274 | 10/1991 | Smith | 30/169 |

Primary Examiner—Richard K. Seidel
Assistant Examiner—Hwei-Siu Pater

[57] ABSTRACT

A device is provided for restoring the cleaning properties of worn vehicle windshield wiper blades. A notch in the body of the hand-held device accepts the working edge of the windshield wiper blade. A sharp steel blade recessed in the notch is thus placed in transverse contact with the working edge of the windshield wiper blade. As the device is drawn along the length of the windshield wiper blade, wiper blade material is removed as needed to restore its original sharp cross-section and smoothness, and hence, its cleaning ability.

2 Claims, 2 Drawing Sheets

WINDSHIELD WIPER SHARPENING DEVICE

SUMMARY

An object of this invention is to provide a simple, rapid, inexpensive solution to the problem of "streaking" windshield wiper blades. In the past, the only remedy was to replace the worn blades. However, blade replacement usually is not feasible during adverse weather conditions when the problem is acute. The present invention achieves the stated object by means of a small manually-operated device whose operation can be understood by considering the following discussion.

A vehicle windshield wiper operates on the principle of a "squeegee", whereby a surface to be cleaned is flooded with water or cleaning solution while the squeegee is dragged along the surface, thus removing fluid and suspended grime. When the working edge of the squeegee blade (i.e., the edge normally in contact with the surface) becomes worn, intimate contact cannot be maintained between the blade and the surface, resulting in "streaks" where water and grime remain on the surface. One approach to renewing the working edge of a worn squeegee blade is shown in U.S. Pat. No. 4,604,802, wherein a complex mechanism secures the squeegee while a razor blade is utilized to cut a sliver from the entire squeegee blade length, thus creating a new working edge. This approach is too cumbersome for windshield wiper blades. However, it has been determined that streaking (and obscured vision) in most instances is due to microscopic irregularities in the windshield wiper blade working edge, and that such worn wiper blades can be restored to full effectiveness by removing a few micro-inches of material from the working edge of the wiper blade, thereby exposing "new rubber". The essential concept is that actual blade material be removed in order to restore the sharp cross-section and effectively provide a new working edge: it is not sufficient to simply clean the worn edge and remove accumulated foreign material. The present invention meets the above requirements and obtains the stated object by providing, in the preferred embodiment, a sharp steel blade in a notched plastic body. This arrangement permits the user to position the defective working edge of a wiper blade within the notch of the invention, and, by drawing the invention along the length of the blade, to restore the efficacy of a worn wiper blade through the mechanism of removing a layer of wiper blade material, exposing smooth "new rubber" and creating a sharp cross section of working edge.

Other objects and features of the invention will become apparent from consideration of the following description taken in connection with the accompanying drawings.

DESCRIPTION OF DRAWINGS

In the accompanying drawings.

DETAILED DESCRIPTION

Figure 1:
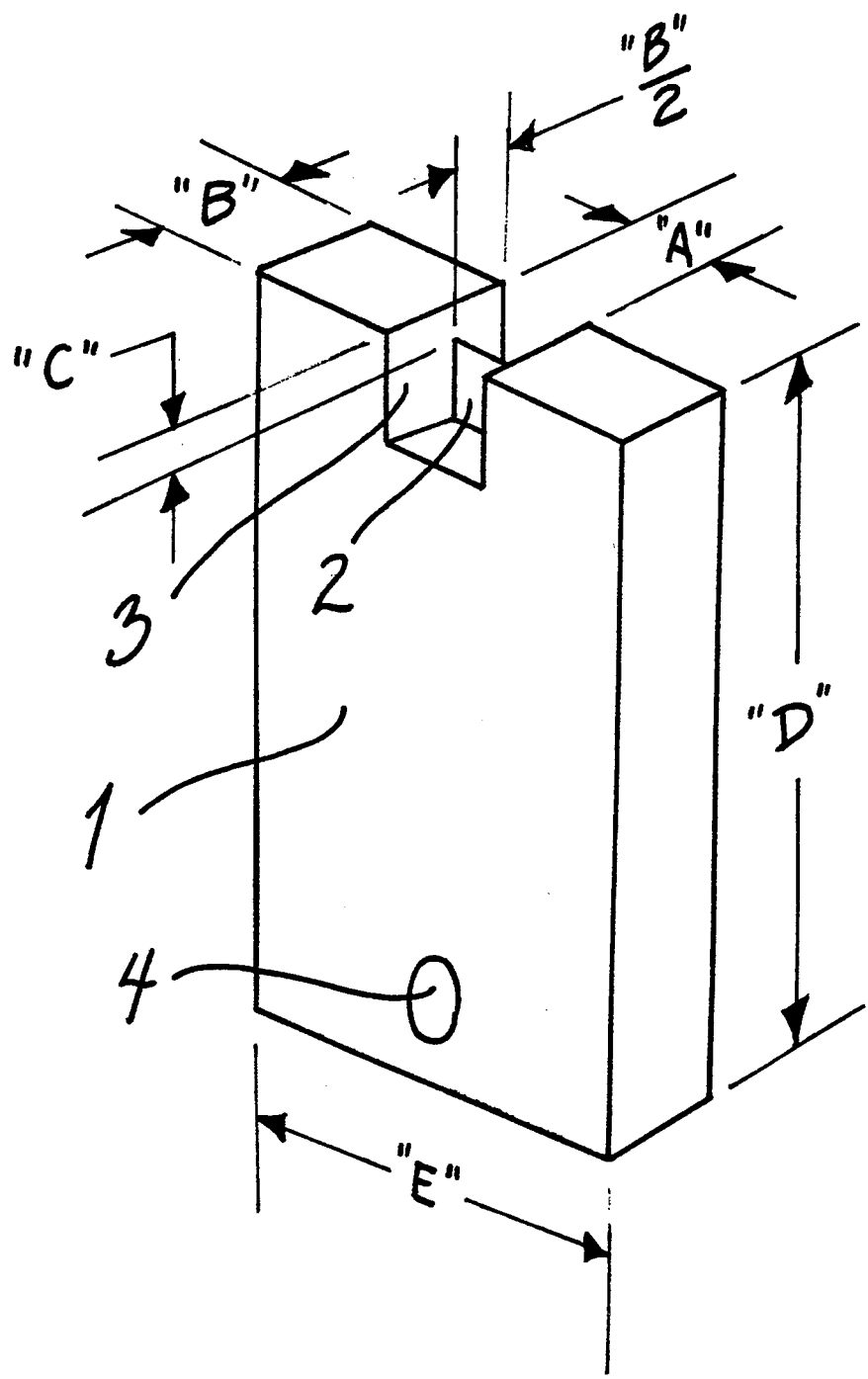
FIG. 1 is a perspective sketch (not to scale) of the preferred embodiment of the invention.

Reference is now made to the drawings.
In FIG. 1 the invention is seen to comprise a body 1 and a sharp steel blade 2.

The body 1 is provided with a notch 3, which is centered in one end of the body 1. Hole 4, located near the end opposite to notch 3, is provided as a convenience for attaching the invention to a key chain or key ring, but is not essential to the invention. In the preferred embodiment, the body 1 is made of plastic; however, any material appropriate to a selected manufacturing technique can be utilized.

Dimensions "A", "B" and "C" are determined by consideration of windshield wiper blades typically found on passenger vehicles. Dimensions "A" and "B" (i.e, the notch width and length, respectively) assure lateral support for the wiper blade being treated. Dimension "C" (depth of cutting edge) is a compromise to achieve support of the flexible wiper blade without interference between body 1 and incidental portions of the windshield wiper assembly.

In the preferred embodiment, dimensions "A" and "C" are approximately 1/16 inch (0.062"), and dimension "B" is approximately ¼ inch (0.25"). Overall dimensions of the body 1 are not critical and are chosen for convenience and "feel"; in the preferred embodiment these are: "D"=2 inches, "E"=1 inch.

Figure 2:
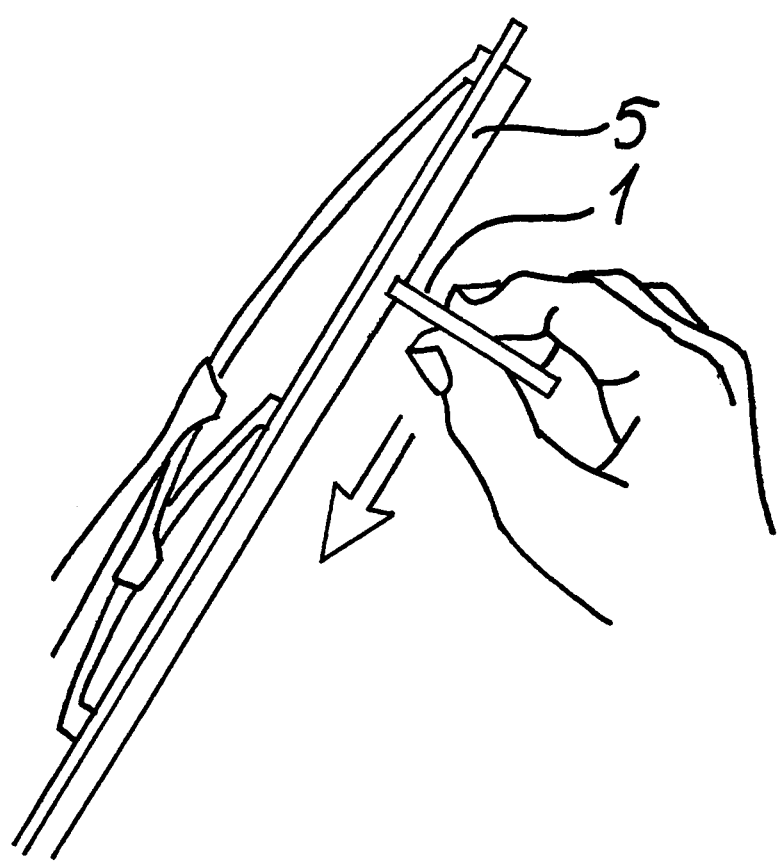
FIG. 2 illustrates the use of the invention.

FIG. 2 illustrates how the invention is used. The operator initially engages notch 3 with the upper end of wiper blade 5. The body 1 of the invention is held at an angle of approximately 90 degrees with respect to the wiper blade 5. In this position, steel blade 2 is in transverse contact with the working edge of wiper blade 5. Slight pressure applied by the operator maintains this contact as the invention is drawn along the length of wiper blade 5, as indicated by the arrow in FIG. 2. This procedure removes material from the working edge of wiper blade 5. The amount of material required to be removed (a function of the severity of wear of the wiper blade) is controlled by (a) force applied by the operator against the blade; (b) number of repetitions of the procedure.

Thus, in accordance with the description, the aforementioned objects and advantages are effectively attained. In the description, dimensions and other characteristics of a preferred embodiment have been described. It should be apparent, however, that the basic concepts of operation can be maintained while adapting various details to specific objectives; i.e., body shapes can be varied for aesthetic reasons, or to accommodate commercial messages, logo designs, etc. For example, embodiments have been fabricated utilizing disc-shaped and tubular (pencil-shaped) bodies. Also, steel blade 2 could, conceptually, be replaced by other means for removing material from the windshield wiper blade being treated. Additionally, several notches and blades could be provided in a common body, to accommodate a range of different windshield wiper sizes (i.e., for trucks, buses, passenger cars, boats, etc).

I claim:
1. A windshield wiper blade sharpening device for restoring the cleaning ability of a vehicle's windshield wiper while said windshield wiper is attached to said vehicle, and comprising:
   (a) a solid body;
   (b) means for controllably removing worn or otherwise deteriorated material from said windshield wiper blade to effect said restoration of cleaning ability, said material being the material of composition of said windshield wiper blade;
   (c) means for limiting bending, twisting and displacement of said windshield wiper blade during said removal of material.

2. A windshield wiper blade sharpening device according to claim 1, wherein:
 (a) said means for limiting bending, twisting and displacement consists of a rectangular notch located at one end of said body;
 (b) said means for removing worn or otherwise deteriorated material consists of a steel blade having a sharp cutting edge;
 (c) said steel blade is fixedly positioned within said notch in such a manner that the full width of said notch is occupied by said blade, and said cutting edge is directed toward the end of said body containing said notch.

* * * * *